United States Patent
Qin et al.

(10) Patent No.: US 8,907,611 B2
(45) Date of Patent: Dec. 9, 2014

(54) METHOD AND APPARATUS FOR SPACE VECTOR PULSE WIDTH MODULATION OF A THREE-PHASE CURRENT CONSTRUCTION WITH SINGLE DC-LINK SHUNT

(75) Inventors: Ling Qin, Houston, TX (US); Bilal Akin, Stafford, TX (US)

(73) Assignee: Texas Instruments Incorporated, Dallas, TX (US)

(*) Notice: Subject to any disclaimer, the term of this patent is extended or adjusted under 35 U.S.C. 154(b) by 567 days.

(21) Appl. No.: 13/183,185

(22) Filed: Jul. 14, 2011

(65) Prior Publication Data

US 2013/0015793 A1    Jan. 17, 2013

(51) Int. Cl.
*G05B 11/28* (2006.01)
*H02P 27/08* (2006.01)

(52) U.S. Cl.
CPC .............. *H02P 27/08* (2013.01); *H02P 27/085* (2013.01)
USPC ..................................... 318/599; 318/400.02

(58) Field of Classification Search
USPC ................. 318/599, 811, 400.02, 727, 801
See application file for complete search history.

(56) References Cited

U.S. PATENT DOCUMENTS

| | | | |
|---|---|---|---|
| 5,309,349 A | 5/1994 | Kwan | |
| 6,735,537 B2 | 5/2004 | Liu et al. | |
| 6,914,409 B2 | 7/2005 | Nukushina | |
| 7,042,192 B2* | 5/2006 | Mehlhorn | 318/806 |
| 7,414,425 B2 | 8/2008 | O'Gorman et al. | |
| 7,612,522 B2* | 11/2009 | Williams et al. | 318/819 |
| 7,728,538 B2* | 6/2010 | D'Angelo et al. | 318/400.02 |
| 7,898,210 B2 | 3/2011 | Hsieh et al. | |
| 7,952,310 B2 | 5/2011 | Hamasaki | |

OTHER PUBLICATIONS

Improved Single Current Sensing Method and Its Realization Based on ADMCF341 DSP Controller, Analog Devices Paper, 1995 (Huo, et al.).
"Phase Current Reconstruction for AC Motor Drives using a DC Link Single Current Sensor and Measurement Voltage Vectors," IEEE Trans. on Power Electronics, vol. 21, No. 5, Sep. 2006, pp. 1413-1419 (Kim, et al.).
"Single Current Sensor Technique in the DC-link of Three-phase PWM-VS Inverters a Review and the Ultimate Solution," IEEE Trans. on Ind. App., vol. 33, No. 5, Sep./Oct. 1997, pp. 1241-1253 (Blaabjerg, et al.).

(Continued)

*Primary Examiner* — Rina Duda
(74) *Attorney, Agent, or Firm* — Alan A. R. Cooper; Frederick J. Telecky, Jr.

(57) ABSTRACT

A method for driving a motor having a plurality of phases is provided. Initially, first, second, and third intervals for a pulse width modulation (PWM) period from first and second voltage commands are generated. The first and second voltage commands correspond to a voltage vector for the motor, and the voltage vector has an associated sector. A conversion formula is then determined for the first, second, third intervals based on the associated sector for the voltage vector. Using the conversion formula and the first, second, and third intervals, fourth, fifth, and sixth intervals are generated, and a set of PWM signals for the PWM period is generated from the fourth, fifth, and sixth intervals. The motor is then driven with the second set of PWM signals, and a current traversing the plurality of phases with a single shunt is measured.

13 Claims, 9 Drawing Sheets

(56) References Cited

OTHER PUBLICATIONS

"Voltage Injection Method for Three-Phase Current Reconstruction in PWM Inverters Using a Single Sensor," IEEE Trans. on Power Electronics, vol. 24, No. 3, Mar. 2009, pp. 767-775 (Jung-Ik Ha).

"Scalar PWM Implementation Methods for Three-phase Three-wire Inverters," Intl. Conf. on Electrical and Electronics Engineering, 2009, pp. 1-447-1-451 (Cetin, et al.).

* cited by examiner

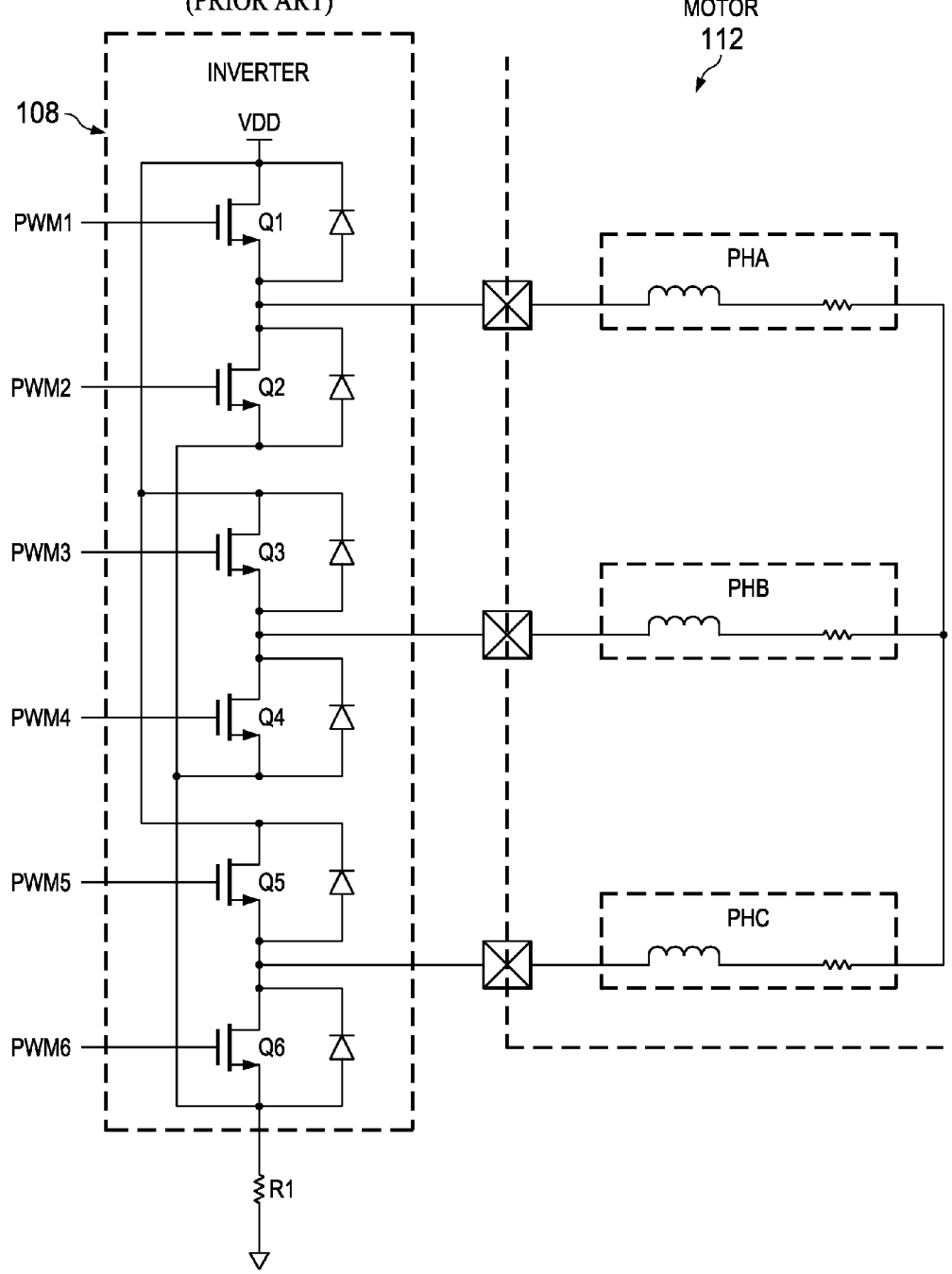

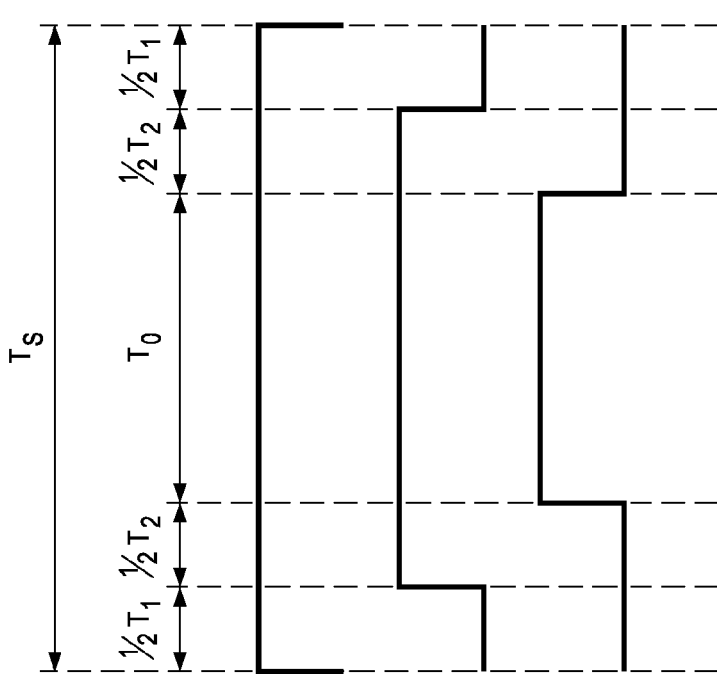
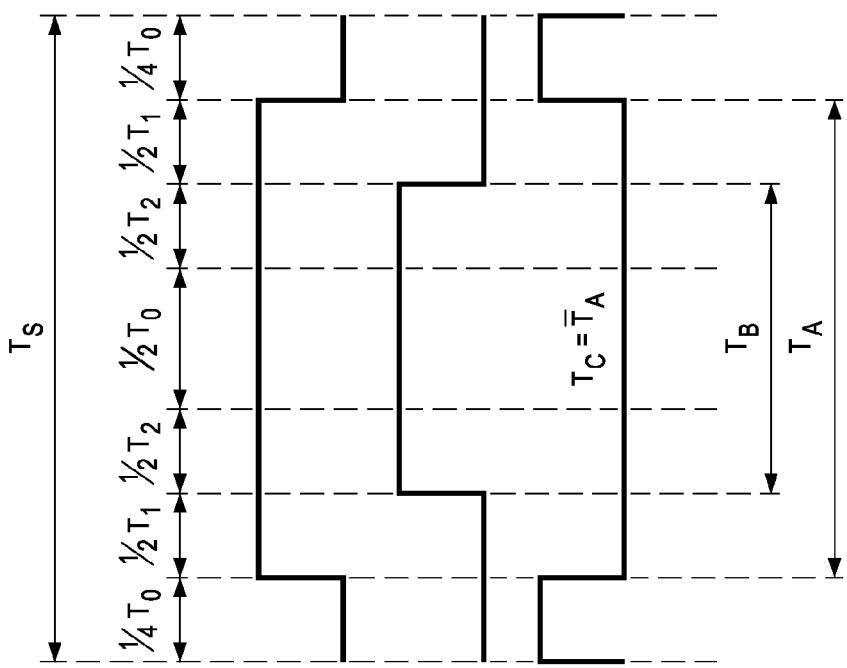
FIG. 6B

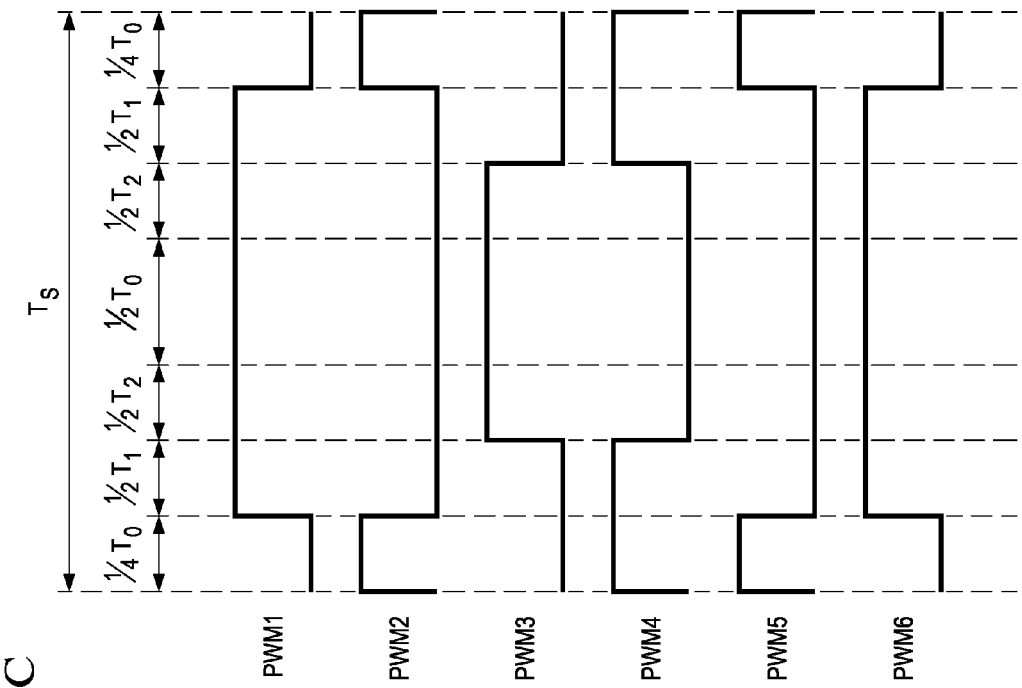
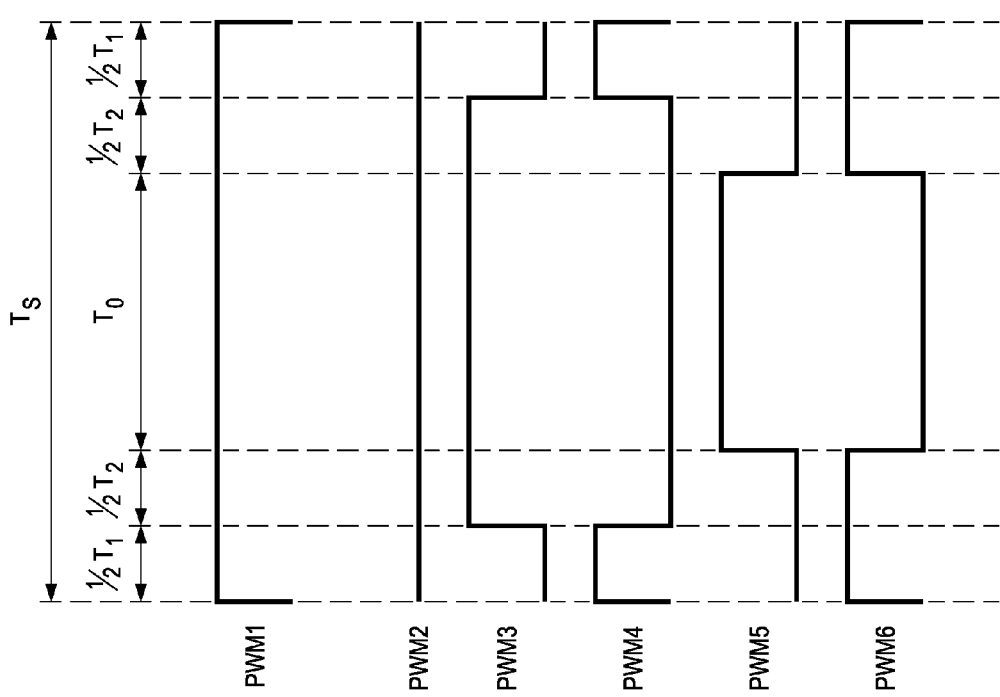
FIG. 6C

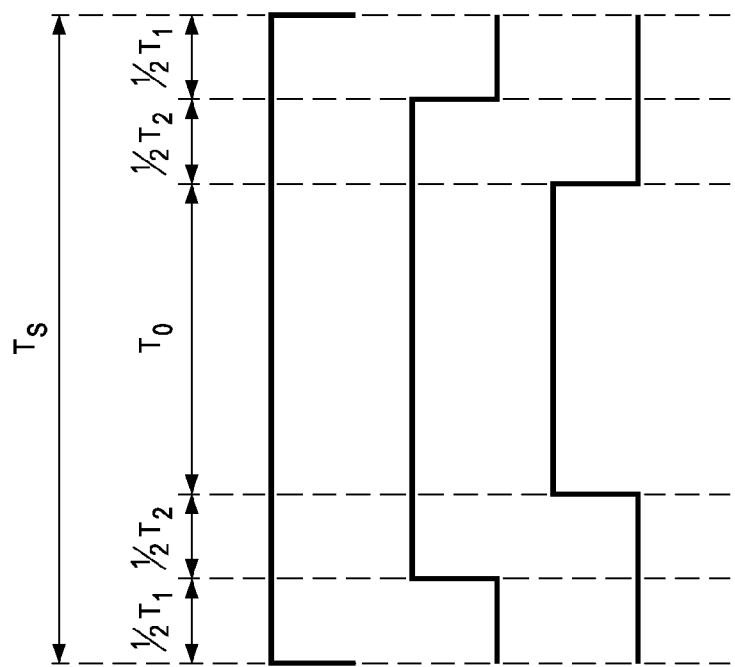
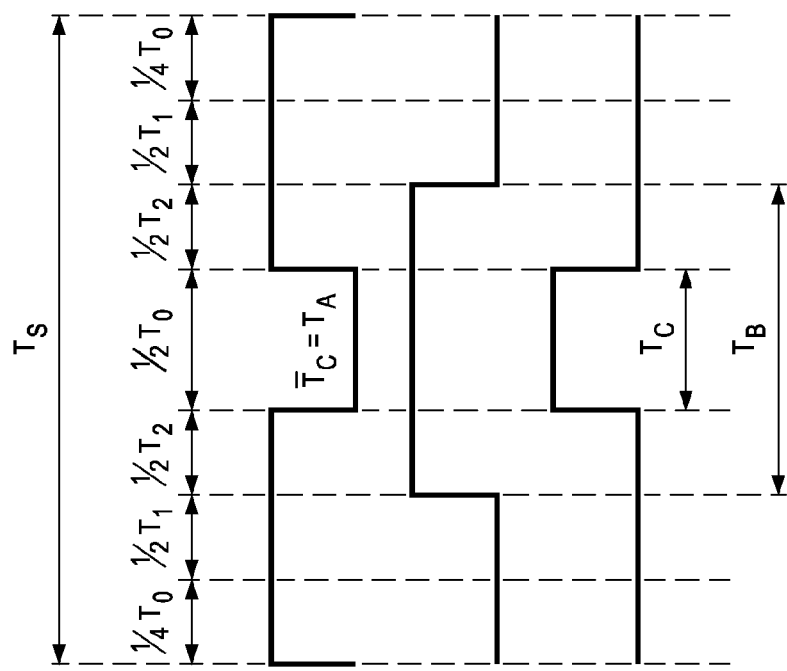
FIG. 7B

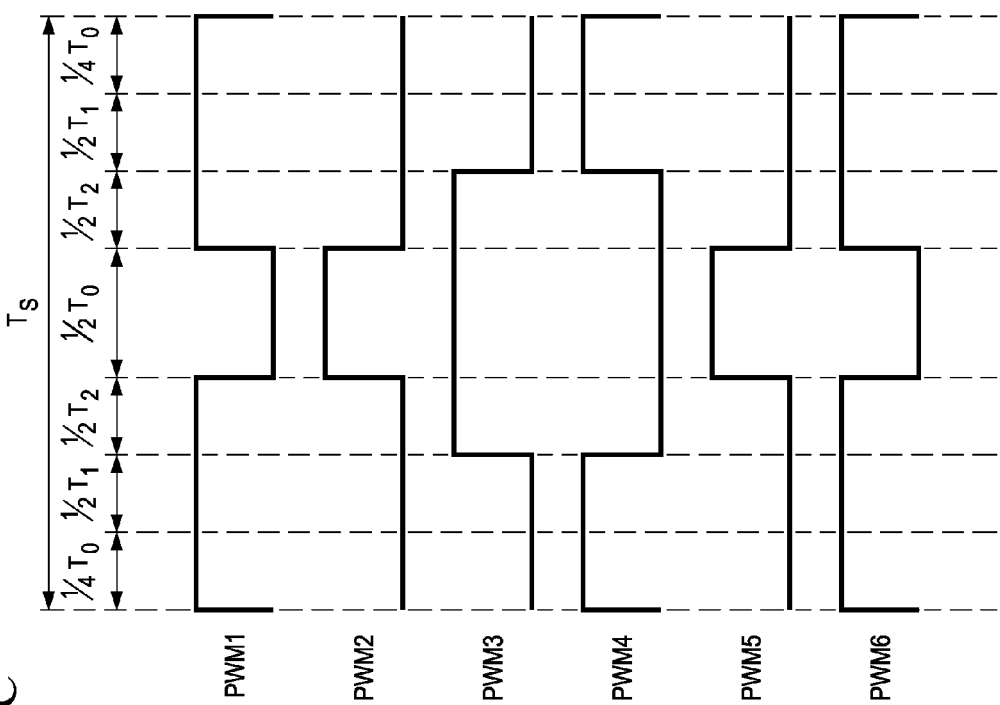
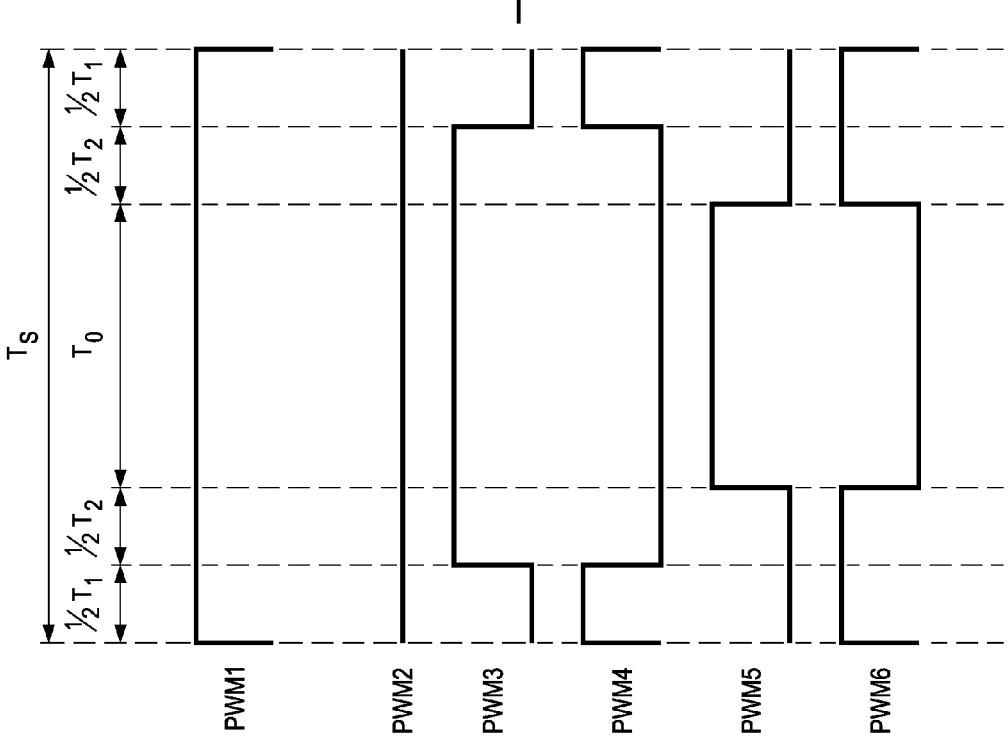
FIG. 7C

METHOD AND APPARATUS FOR SPACE VECTOR PULSE WIDTH MODULATION OF A THREE-PHASE CURRENT CONSTRUCTION WITH SINGLE DC-LINK SHUNT

TECHNICAL FIELD

The invention relates generally to motor control and, more particularly, to motor control with single DC-link shunt.

BACKGROUND

Turning to FIGS. 1 and 2, a conventional system 100 can be seen. This system 100 generally comprises a motor controller 102, an inverter 108, resistor R1, and a motor 112. Motor 112 can have several phases (as shown, is a three-phase motor) and can be a brushless direct current (DC) motor, induction motor, and so forth. The motor controller 102 generally includes a controller 104, space vector pulse width modulator (SVPWM) 106, and analog-to-digital converter (ADC) 110, and inverter 108 generally includes transistor Q1 to Q6, which are controlled by pulse width modulation (PWM) signals PWM1 to PWM6, respectively. In operation, the motor controller 102 provides pulse width modulation through PWM signals PWM1 to PWM6 over consecutive PWM periods $T_S$ so as to drive the motor 112 using an control algorithm, and, as shown, this system 100 employs a single shunt (i.e., resistor R1) to measure the current traversing the phases of motor 112, which is used by the control algorithm.

Because a single shunt is employed (as opposed to two or three shunts), the ADC 110 should be fast enough to sample the shunt current, while noise in transient current response should be avoided; this, under most circumstances, is practicable. In FIG. 3A, a voltage vector diagram can be seen, where the bounders of the sectors (i.e., sectors I to VI) correspond to the states of transistors Q1 to Q6 of the inverter (as shown in Table 1 below).

TABLE 1

| Vector | (xyz) | Q1 | Q2 | Q3 | Q4 | Q5 | Q6 |
|---|---|---|---|---|---|---|---|
| V0 | (000) | 0 | 1 | 0 | 1 | 0 | 1 |
| V1 | (100) | 1 | 0 | 0 | 1 | 0 | 1 |
| V2 | (110) | 1 | 0 | 1 | 0 | 0 | 1 |
| V3 | (010) | 0 | 1 | 1 | 0 | 0 | 1 |
| V4 | (011) | 0 | 1 | 1 | 0 | 1 | 0 |
| V5 | (001) | 0 | 1 | 0 | 1 | 1 | 0 |
| V6 | (101) | 1 | 0 | 0 | 1 | 1 | 0 |
| V7 | (111) | 1 | 0 | 1 | 0 | 1 | 0 |

As shown, the example voltage vector is located in sector I (having an angle $\theta$). From this voltage vector, there are two resultant projections $T_1$ and $T_2$ that correspond to intervals over which the vectors V1 and V2 are applied over the associated PWM period. These intervals $T_1$ and $T_2$ and vectors V1 and V2 are typically generated by SVPWM 106 based on voltage commands $v_\alpha$, and $v_\beta$ that are issued by controller 104. As shown in FIG. 3B, one-half of each of intervals $T_1$ and $T_2$ (over which vectors V1 and V2 are applied, respectively) located are at each end of the PWM period with the remainder of the PWM period being the zero vector V7 or V0, which yield the set of PWM signals shown in FIG. 3C that drive motor 112.

For high speed applications, this methodology can function quite well, but, for low speed operation of the motor 112, the zero vector region (where there is no shunt current) becomes quite large compared to the PWM period. This means that at least one of the projections of periods (i.e., $T_1$ or $T_2$) can become quite small. For example, as the angle $\theta$ for the example voltage vector in FIG. 3A approaches 60°, the interval $T_1$ becomes very small, or, alternatively, as the angle $\theta$ for the example voltage vector in FIG. 3A approaches 0°, the interval $T_2$ becomes very small. Because these periods (i.e., as the angle $\theta$ for the example voltage vector in FIG. 3A approaches 60°) are so small, ADC 110 may not be able to accurately measure the shunt current, which may be true for any of the shaded error regions of FIG. 4 (which are generally in proximity to vectors V1 to V7).

Thus, there is a need for an improved PWM algorithm.

Some examples of conventional systems are: U.S. Pat. Nos. 5,309,349; 6,735,537; 6,914,409; 7,414,425; 7,898,210; 7,952,310; Huo et al., Improved Single Current Sensing Method and Its Realization Based on ADMCF341 DSP Controller," *Analog Devices Technical Paper,* 1995; Kim et al., "Phase Current Reconstruction for AC Motor Drives Using a DC Link Single Current Sensor and Measurement Voltage Vectors," *IEEE Trans. on Power Electronics, Vol.* 21, No. 5, September 2006, pp. 1413-1419; Blaabjerg et al.; "Single Current Sensor Technique in the DC Link of Three-Phase PWM-VS Inverters: A Review and a Novel Solution," *IEEE Trans. on Ind. App.*, Vol. 33, No. 5, September/October 1997, pp. 1241-1253; Jung-Ik Ha, "Voltage Injection Method for Three-Phase Current Reconstruction in PWM Inverters Using a Single Sensor," *IEEE Trans. on Power Electronics,* Vol. 24, No. 3, March 2009, pp. 767-775; and Cetin et al., "Scalar PWM implementation methods for three phase three-wire inverters," *Intl. Conf. on Electrical and Electronics Engineering,* 2009, pp. 1-447-1-451.

SUMMARY

An embodiment of the present invention, accordingly, provides a method for driving a motor having a plurality of phases. The method comprises generating first, second, and third intervals for a pulse width modulation (PWM) period from first and second voltage commands, wherein the first and second voltage commands correspond to a voltage vector for motor, and wherein the voltage vector has an associated sector; determining a conversion formula for the first, second, third intervals based on the associated sector for the voltage vector; generating fourth, fifth, and sixth intervals from the conversion formula and the first, second, and third intervals; generating a set of PWM signals for the PWM period from the fourth, fifth, and sixth intervals; driving motor with the second set of PWM signals; and measuring a current traversing the plurality of phases with a single shunt.

In accordance with an embodiment of the present invention, the associated sector is one of a first, second, third, fourth, fifth, and six sectors, and wherein the motor has three phases.

In accordance with an embodiment of the present invention, the associated sector is the first sector or the fourth sector, and wherein the step of determining the conversion formula further comprises: if the voltage vector is in proximity to the sixth sector or third sector, dividing the sum of the PWM period and the second interval by two to generate the fourth interval; if the voltage vector is in proximity to the sixth sector or third sector, dividing the sum of the PWM period, the first interval, and the negative of the third interval by two to generate the fifth interval; and if the voltage vector is in proximity to the sixth sector or third sector, equating the inverse of the fourth interval to generate the sixth interval.

In accordance with an embodiment of the present invention, the step of determining the conversion formula further comprises: if the voltage vector is in proximity to the second sector or fifth sector, dividing the sum of the PWM period and the negative of the second interval by two to generate the sixth interval; if the voltage vector is in proximity to the second sector or fifth sector, dividing the sum of the PWM period, the first interval, and the negative of the third interval by two to generate the fifth interval; and if the voltage vector is in proximity to the second sector or fifth sector, equating the fourth interval to the inverse of the sixth interval.

In accordance with an embodiment of the present invention, the associated sector is the second sector or the fifth sector, and wherein the step of determining the conversion formula further comprises: if the voltage vector is in proximity to the first sector or fourth sector, dividing the sum of the PWM period, the second interval, and the third interval by two to generate the fourth interval; if the voltage vector is in proximity to the first sector or fourth sector, dividing the sum of the PWM period and the negative of the first interval by two to generate the sixth interval; and if the voltage vector is in proximity to the first sector or fourth sector, equating the fifth interval to the inverse of the sixth interval.

In accordance with an embodiment of the present invention, the step of determining the conversion formula further comprises: if the voltage vector is in proximity to the third sector or sixth sector, dividing the sum of the PWM period, the second interval, and the third interval by two to generate the fourth interval; if the voltage vector is in proximity to the third sector or sixth sector, dividing the sum of the PWM period and the first interval by two to generate the fifth interval; and if the voltage vector is in proximity to the third sector or sixth sector, equating the sixth interval to the inverse of the fifth interval.

In accordance with an embodiment of the present invention, the associated sector is the third sector or the sixth sector, and wherein the step of determining the conversion formula further comprises: if the voltage vector is in proximity to the second sector or fifth sector, dividing the sum of the PWM period and the negative of the third interval by two to generate the fifth interval; if the voltage vector is in proximity to the second sector or fifth sector, dividing the sum of the PWM period, the negative of the second interval, and the negative of the first interval by two to generate the sixth interval; and if the voltage vector is in proximity to the second sector or fifth sector, equating the fourth interval to the inverse of the fifth interval.

In accordance with an embodiment of the present invention, the step of determining the conversion formula further comprises: if the voltage vector is in proximity to the second sector or fifth sector, dividing the sum of the PWM period and the third interval by two to generate the fourth interval; if the voltage vector is in proximity to the second sector or fifth sector, dividing the sum of the PWM period, the negative of the second interval, and the negative of the first interval by two to generate the sixth interval; and if the voltage vector is in proximity to the second sector or fifth sector, equating the fifth interval to the inverse of the fourth interval.

In accordance with an embodiment of the present invention, an apparatus is provided. The apparatus comprises a motor having a plurality of phases; an inverter that is coupled to drive the motor; a sense resistor that is coupled to the driver, wherein the sense resistor is configured to measure the current for each phase of the motor; an analog-to-digital converter (ADC) that is coupled to the sense resistor; and a controller that is coupled ADC; and a space vector pulse width modulator (SVPWM) that is coupled to the controller and the driver, wherein the SVPWM includes a processor having a memory with a computer program embodied thereon, and wherein the computer programs includes: computer code for generating first, second, and third intervals for a PWM period from first and second voltage commands, wherein the first and second voltage commands correspond to a voltage vector for the motor, and wherein the voltage vector has an associated sector; computer code for determining a conversion formula for the first, second, third intervals based on the associated sector for the voltage vector; computer code for generating fourth, fifth, and sixth intervals from the conversion formula and the first, second, and third intervals; and computer code for generating a set of PWM signals for the PWM period from the fourth, fifth, and sixth intervals.

In accordance with an embodiment of the present invention, the associated sector is the first sector or the fourth sector, and wherein the computer code for determining the conversion formula further comprises: computer code for dividing the sum of the PWM period and the second interval by two to generate the fourth interval if the voltage vector is in proximity to the sixth sector or third sector; computer code for dividing the sum of the PWM period, the first interval, and the negative of the third interval by two to generate the fifth interval if the voltage vector is in proximity to the sixth sector or third sector; and computer code for equating the inverse of the fourth interval to generate the sixth interval if the voltage vector is in proximity to the sixth sector or third sector.

In accordance with an embodiment of the present invention, the computer code for determining the conversion formula further comprises: computer code for dividing the sum of the PWM period and the negative of the second interval by two to generate the sixth interval if the voltage vector is in proximity to the second sector or fifth sector; computer code for dividing the sum of the PWM period, the first interval, and the negative of the third interval by two to generate the fifth interval if the voltage vector is in proximity to the second sector or fifth sector; and computer code for equating the fourth interval to the inverse of the sixth interval if the voltage vector is in proximity to the second sector or fifth sector.

In accordance with an embodiment of the present invention, the associated sector is the second sector or the fifth sector, and wherein the computer code for determining the conversion formula further comprises: computer code for dividing the sum of the PWM period, the second interval, and the third interval by two to generate the fourth interval if the voltage vector is in proximity to the first sector or fourth sector; computer code for dividing the sum of the PWM period and the negative of the first interval by two to generate the sixth interval if the voltage vector is in proximity to the first sector or fourth sector; and computer code for equating the fifth interval to the inverse of the sixth interval if the voltage vector is in proximity to the first sector or fourth sector.

In accordance with an embodiment of the present invention, the computer code for determining the conversion formula further comprises: computer code for dividing the sum of the PWM period, the second interval, and the third interval by two to generate the fourth interval if the voltage vector is in proximity to the third sector or sixth sector; computer code for dividing the sum of the PWM period and the first interval by two to generate the fifth interval if the voltage vector is in proximity to the third sector or sixth sector; and computer code for equating the sixth interval to the inverse of the fifth interval if the voltage vector is in proximity to the third sector or sixth sector.

In accordance with an embodiment of the present invention, the associated sector is the third sector or the sixth sector, and wherein the computer code for determining the conversion formula further comprises: computer code for dividing the sum of the PWM period and the negative of the third interval by two to generate the fifth interval if the voltage vector is in proximity to the second sector or fifth sector; computer code for dividing the sum of the PWM period, the negative of the second interval, and the negative of the first interval by two to generate the sixth interval if the voltage vector is in proximity to the second sector or fifth sector; and computer code for equating the fourth interval to the inverse of the fifth interval if the voltage vector is in proximity to the second sector or fifth sector.

In accordance with an embodiment of the present invention, the computer code for determining the conversion formula further comprises: computer code for dividing the sum of the PWM period and the third interval by two to generate the fourth interval if the voltage vector is in proximity to the second sector or fifth sector; computer code for dividing the sum of the PWM period, the negative of the second interval, and the negative of the first interval by two to generate the sixth interval if the voltage vector is in proximity to the second sector or fifth sector; and computer code for equating the fifth interval to the inverse of the fourth interval if the voltage vector is in proximity to the second sector or fifth sector.

In accordance with an embodiment of the present invention, an apparatus is provided. The apparatus comprises a motor having a three phases; an inverter that is coupled to drive the motor; a sense resistor that is coupled to the driver, wherein the sense resistor is configured to measure the current for each phase of motor; an ADC that is coupled to the sense resistor; and a controller that is coupled ADC; and a SVPWM that is coupled to the controller and the driver, wherein the SVPWM includes a processor having a memory with a computer program embodied thereon, and wherein the computer programs includes: computer code for generating first, second, and third intervals for a PWM period from first and second voltage commands, wherein the first and second voltage commands correspond to a voltage vector for the motor, and wherein the voltage vector has an associated sector, and wherein the associated sector is one of a first, second, third, fourth, fifth, and six sectors; computer code for determining a conversion formula for the first, second, third intervals based on the associated sector for the voltage vector that includes: computer code for dividing the sum of the PWM period and the second interval by two to generate the fourth interval if the voltage vector is in proximity to the sixth sector or third sector when the associated sector is the first sector or the fourth sector; computer code for dividing the sum of the PWM period, the first interval, and the negative of the third interval by two to generate the fifth interval if the voltage vector is in proximity to the sixth sector or third sector when the associated sector is the first sector or the fourth sector when the associated sector is the first sector or the fourth sector; computer code for dividing the sum of the PWM period and the negative of the second interval by two to generate the sixth interval if the voltage vector is in proximity to the second sector or fifth sector when the associated sector is the first sector or the fourth sector; computer code for dividing the sum of the PWM period, the first interval, and the negative of the third interval by two to generate the fifth interval if the voltage vector is in proximity to the second sector or fifth sector when the associated sector is the first sector or the fourth sector; computer code for equating the fourth interval to the inverse of the sixth interval if the voltage vector is in proximity to the second sector or fifth sector when the associated sector is the first sector or the fourth sector; computer code for dividing the sum of the PWM period, the second interval, and the third interval by two to generate the fourth interval if the voltage vector is in proximity to the first sector or fourth sector when the associated sector is the second sector or the fifth sector; computer code for dividing the sum of the PWM period and the negative of the first interval by two to generate the sixth interval if the voltage vector is in proximity to the first sector or fourth sector when the associated sector is the second sector or the fifth sector; computer code for equating the fifth interval to the inverse of the sixth interval if the voltage vector is in proximity to the first sector or fourth sector when the associated sector is the second sector or the fifth sector; computer code for dividing the sum of the PWM period, the second interval, and the third interval by two to generate the fourth interval if the voltage vector is in proximity to the third sector or sixth sector when the associated sector is the second sector or the fifth sector; computer code for dividing the sum of the PWM period and the first interval by two to generate the fifth interval if the voltage vector is in proximity to the third sector or sixth sector when the associated sector is the second sector or the fifth sector; computer code for equating the sixth interval to the inverse of the fifth interval if the voltage vector is in proximity to the third sector or sixth sector when the associated sector is the second sector or the fifth sector; computer code for dividing the sum of the PWM period and the negative of the third interval by two to generate the fifth interval if the voltage vector is in proximity to the second sector or fifth sector when the associated sector is the third sector or the sixth sector; computer code for dividing the sum of the PWM period, the negative of the second interval, and the negative of the first interval by two to generate the sixth interval if the voltage vector is in proximity to the second sector or fifth sector the associated sector is the third sector or the sixth sector; computer code for equating the fourth interval to the inverse of the fifth interval if the voltage vector is in proximity to the second sector or fifth sector the associated sector is the third sector or the sixth sector; computer code for dividing the sum of the PWM period and the third interval by two to generate the fourth interval if the voltage vector is in proximity to the second sector or fifth sector the associated sector is the third sector or the sixth sector; computer code for dividing the sum of the PWM period, the negative of the second interval, and the negative of the first interval by two to generate the sixth interval if the voltage vector is in proximity to the second sector or fifth sector the associated sector is the third sector or the sixth sector; and computer code for equating the fifth interval to the inverse of the fourth interval if the voltage vector is in proximity to the second sector or fifth sector the associated sector is the third sector or the sixth sector; computer code for equating the inverse of the fourth interval to generate the sixth interval if the voltage vector is in proximity to the sixth sector or third sector; computer code for generating fourth, fifth, and sixth intervals from the conversion formula and the first, second, and third intervals; and computer code for generating a set of PWM signals for the PWM period from the fourth, fifth, and sixth intervals.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is a diagram of an example of the motor and inverter of FIG. 1;

FIG. 6B is an example of a conversion of a timing diagram of a voltage command of FIG. 3B for a voltage vector in sector I that is in proximity to sector VI in accordance with an embodiment of the present invention;

FIG. 6C is an example of a conversion of a set of PWM signals of FIG. 3C for a voltage vector in sector I that is in proximity to sector VI in accordance with an embodiment of the present invention;

FIG. 7B is an example of a conversion of a timing diagram of FIG. 3B for a voltage vector in sector I that is in proximity to sector II in accordance with an embodiment of the present invention; and FIG. 7C is an example of a conversion of a set of PWM signals of FIG. 3C for a voltage vector in sector I that is in proximity to sector II in accordance with an embodiment of the present invention.

DETAILED DESCRIPTION

Figure 1:
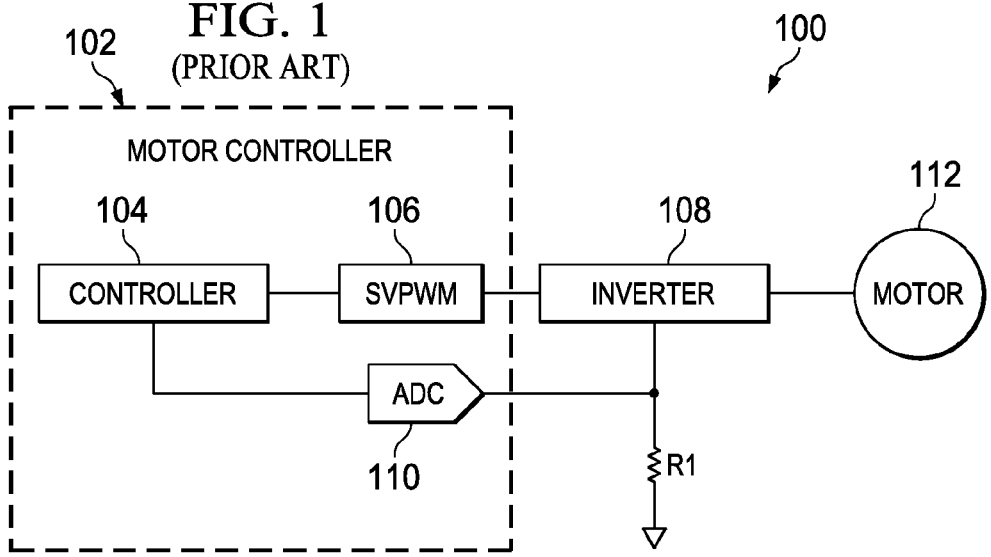
FIG. 1 is a diagram of an example of a conventional system.

Refer now to the drawings wherein depicted elements are, for the sake of clarity, not necessarily shown to scale and wherein like or similar elements are designated by the same reference numeral through the several views.

Figure 5:
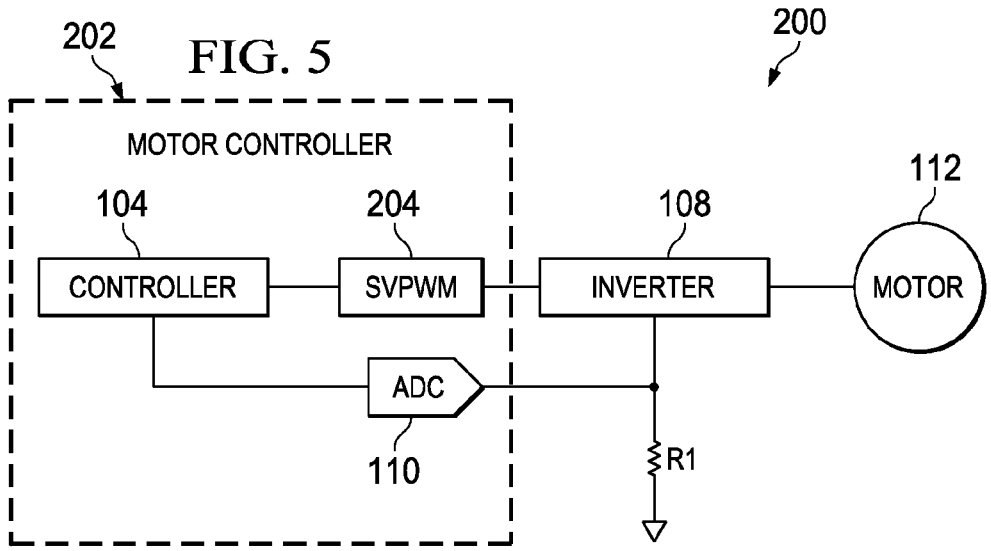
FIG. 5 is a diagram of a system in accordance with an embodiment of the present invention.
Figure 3A:
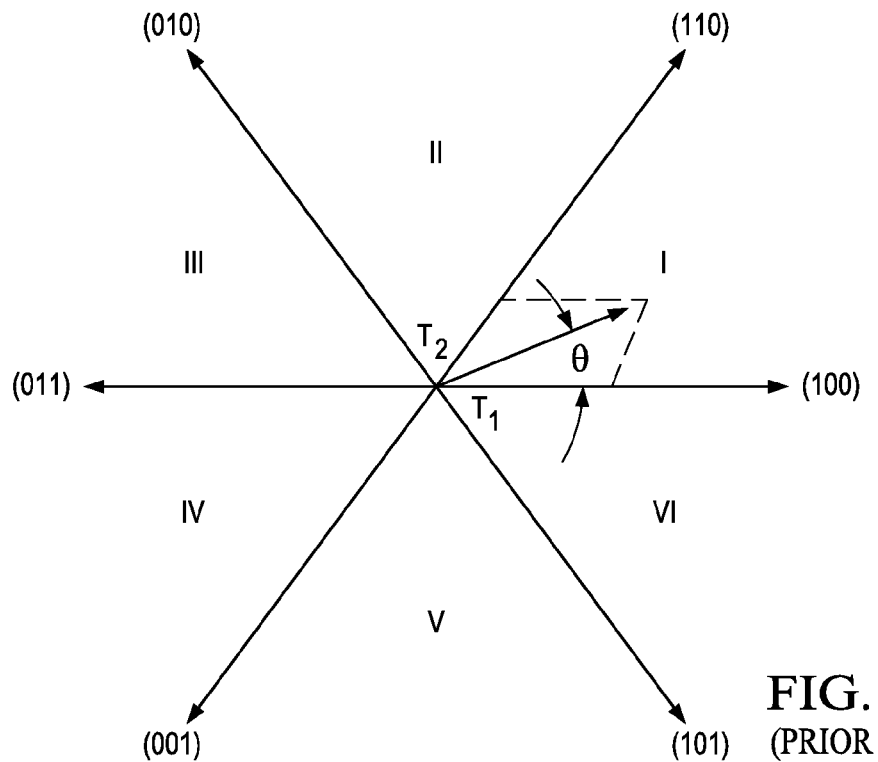
FIG. 3A is an example of a voltage vector diagram for the system of FIG. 1.
Figure 3B:
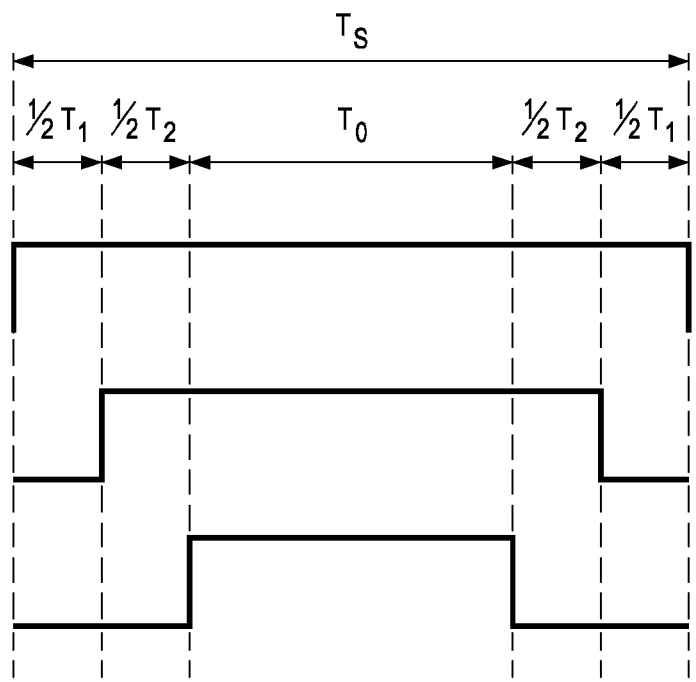
FIG. 3B is an example of a timing diagram of a voltage command for the voltage vector diagram of FIG. 3.
Figure 3C:
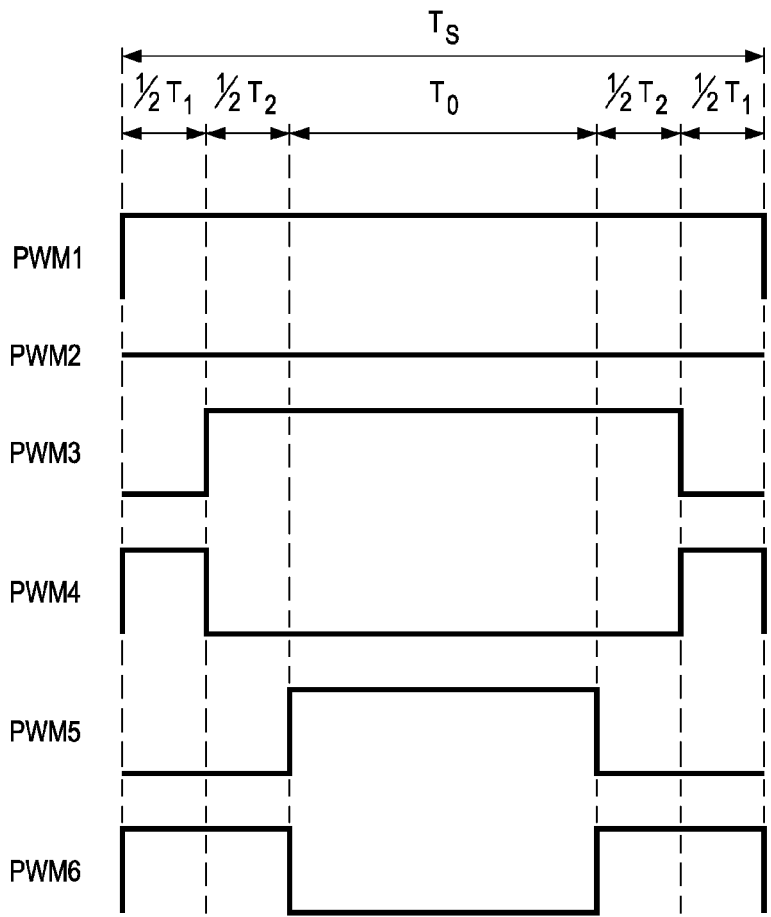
FIG. 3C is an example of a set of PWM signals corresponding to the timing diagram of FIG. 3B.
Figure 4:
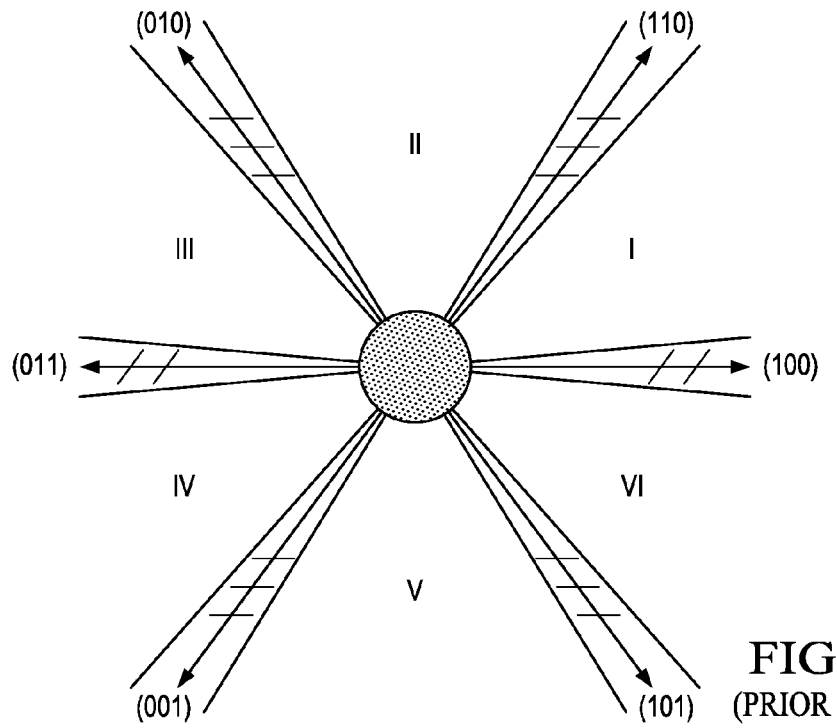
FIG. 4 is a diagram of a voltage vector diagram indicating error regions.

Turning to FIG. 5, an example of a system 200 in accordance with a preferred embodiment of the present invention. System 200 is similar in construction to system 100, except that SVPWM 106 has been replaced by SVPWM 204 in motor controller 202. SVPWM 204, similar to SVPWM 106, receives voltage commands $v_\alpha$, and $v_\beta$ from controller 106, but SVPWM 204 employs a conversion process that is able to adjust the timing diagram and PWM signals (i.e., such as the timing diagram of FIG. 3B and set of PWM signals of FIG. 3C). Initially, SVPWM 204 can generate intervals $t_1$, $t_2$, and $t_3$ (which are different from intervals $T_1$, $T_2$, and $T_0$ described above) using the following equations:

$$t_1 = \frac{2}{\sqrt{3}} v_\beta T_S \quad (1)$$

$$t_2 = v_\alpha T_S + \frac{t_1}{2} \quad (2)$$

$$t_3 = t_2 - t_1 \quad (3)$$

Once the intervals $t_1$, $t_2$, and $t_3$ have been determined or calculated, SVPWM 204 employs a lookup table to perform a subsequent calculation to determine intervals $T_A$, $T_B$, and $T_C$. The calculation of intervals $T_A$, $T_B$, and $T_C$ is based on the position of the voltage vector (i.e., intervals $T_0$, $T_1$, and $T_2$ and vectors V1 and V2), which can calculated using the algorithm employed by SPPWM 106, so as to allow a mathematically equivalent voltage vector to be constructed. These conversions effectively "break up" the zero vector (i.e., interval $T_0$ in FIG. 3B) into smaller intervals, which are separated from one another across the PWM period. By "breaking up" the zero vector, the constraints on the ADC 110 are relaxed, allowing it to perform accurate measurements under low speed or boundary conditions. An example of the lookup table used by SVPWM 204 can be seen below in Table 2. Additionally, the lookup table can be implemented in hardware or software (i.e., SVWPM includes a processor and memory with a computer program embodied thereon).

TABLE 2

| Section | In Proximity to the Previous Section | In Proximity to the Next Section |
|---|---|---|
| I | $T_A = \frac{T_S + t_2}{2}$ | $T_A = \overline{T_C}$ |
|  | $T_B = \frac{T_S - t_3 + t_1}{2}$ | $T_B = \frac{T_S - t_3 + t_1}{2}$ |
|  | $T_C = \overline{T_A}$ | $T_C = \frac{T_S - t_2}{2}$ |
| II | $T_A = \frac{T_S + t_3 + t_2}{2}$ | $T_A = \frac{T_S + t_3 + t_2}{2}$ |
|  | $T_B = \overline{T_C}$ | $T_B = \frac{T_S + t_1}{2}$ |
|  | $T_C = \frac{T_S - t_1}{2}$ | $T_C = \overline{T_B}$ |
| III | $T_A = \overline{T_B}$ | $T_A = \frac{T_S + t_3}{2}$ |
|  | $T_B = \frac{T_S - t_3}{2}$ | $T_B = \overline{T_A}$ |
|  | $T_C = \frac{T_S - t_1 - t_2}{2}$ | $T_C = \frac{T_S - t_1 - t_2}{2}$ |
| IV | $T_A = \frac{T_S + t_2}{2}$ | $T_A = \overline{T_C}$ |
|  | $T_B = \frac{T_S - t_3 + t_1}{2}$ | $T_B = \frac{T_S - t_3 + t_1}{2}$ |
|  | $T_C = \overline{T_A}$ | $T_C = \frac{T_S - t_2}{2}$ |

TABLE 2-continued

| Section | In Proximity to the Previous Section | In Proximity to the Next Section |
|---|---|---|
| V | $T_A = \dfrac{T_S + t_3 + t_2}{2}$ | $T_A = \dfrac{T_S + t_3 + t_2}{2}$ |
|   | $T_B = \overline{T_C}$ | $T_B = \dfrac{T_S + t_1}{2}$ |
|   | $T_C = \dfrac{T_S - t_1}{2}$ | $T_C = \overline{T_B}$ |
| VI | $T_A = \overline{T_B}$ | $T_A = \dfrac{T_S + t_3}{2}$ |
|   | $T_B = \dfrac{T_S - t_3}{2}$ | $T_B = \overline{T_A}$ |
|   | $T_C = \dfrac{T_S - t_1 - t_2}{2}$ | $T_C = \dfrac{T_S - t_1 - t_2}{2}$ |

Figure 6A:
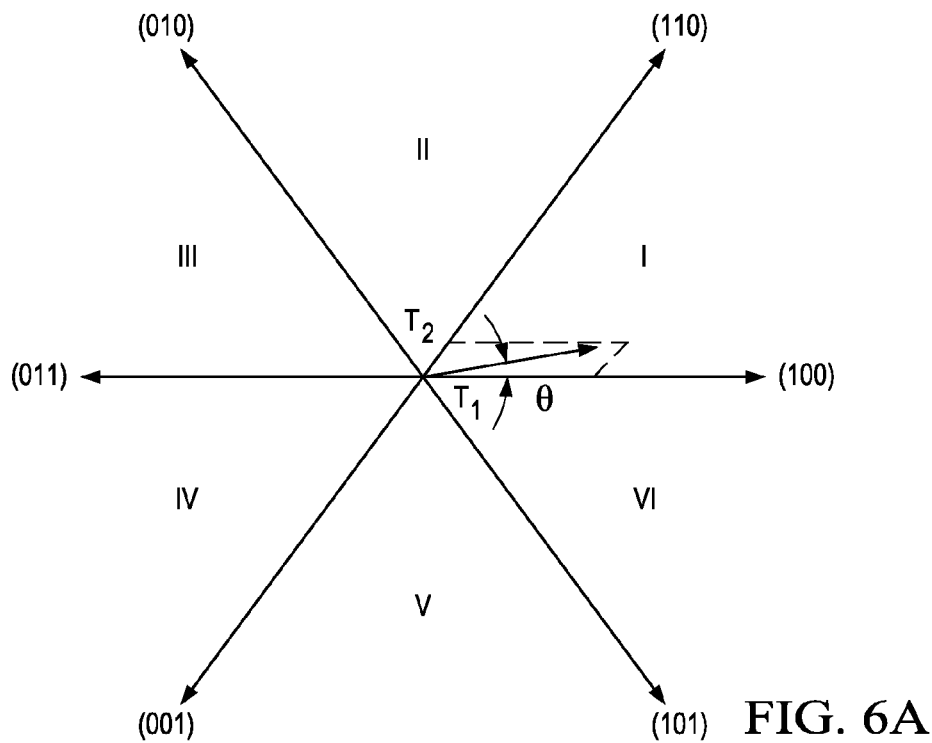
FIG. 6A is an example of a voltage vector diagram having a voltage vector in sector I that is in proximity to sector VI in accordance with an embodiment of the present invention.

Turning to FIGS. 6A through 6C, an example of the operation of the motor controller 202 can be seen. For this example and as shown in FIG. 6A, the voltage vector (which can be determined using the algorithm employed by SVPWM 106) is located in sector I in proximity to section VI (which is the previous section). Thus, based on the lookup table provided in Table 2 above, the following equations can be employed to determine intervals $T_A$, $T_B$, and $T_C$:

$$T_A = \frac{T_S + t_2}{2} \quad (4)$$

$$T_B = \frac{T_S - t_3 + t_1}{2} \quad (5)$$

$$T_C = \overline{T_A} \quad (6)$$

After the calculation of $T_A$, $T_B$, and $T_C$ using equations (1) through (6) above, intervals $T_A$ is ½$T_0$+$T_2$+$T_1$ (which is centered within the PWM period), and $T_B$ is ½$T_0$+$T_2$ (which is centered within the PWM period). Additionally, intervals $T_C$ is the inverse of intervals $T_A$. Each of these intervals $T_A$, $T_B$, and $T_C$ are shown in FIG. 6B, and the corresponding set of PWM signals can be seen in FIG. 6C. Thus, as can be easily seen, the zero vector (interval $T_0$) has been "broken up" so as to form a mathematically equivalent voltage vector.

Figure 7A:
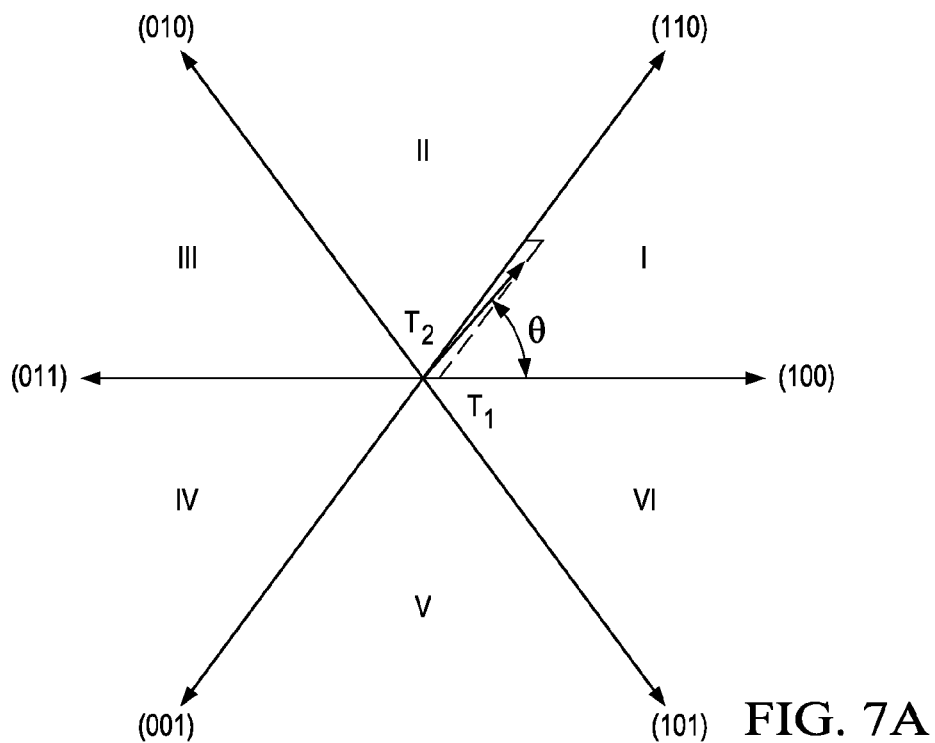
FIG. 7A is an example of a voltage vector diagram of a voltage command having a voltage vector in sector I that is in proximity to sector II in accordance with an embodiment of the present invention.

Finally, turning to FIGS. 7A through 7C, another example 6A through 6C, an example of the operation of the motor controller 202 can be seen. For this example and as shown in FIG. 7A, the voltage vector (which can be determined using the algorithm employed by SVPWM 106) is located in sector I in proximity to section II (which is the next section). Thus, based on the lookup table provided in Table 2 above, the following equations can be employed to determine intervals $T_A$, $T_B$, and $T_C$:

$$T_A = \overline{T_C} \quad (7)$$

$$T_B = \frac{T_S - t_3 + t_1}{2} \quad (8)$$

$$T_C = \frac{T_S - t_2}{2} \quad (9)$$

After the calculation of $T_A$, $T_B$, and $T_C$ using equations (1)-(3) and (7)-(9) above, intervals $T_C$ is ½$T_0$ (which is centered within the PWM period), and $T_B$ is ½$T_0$+$T_2$ (which is centered within the PWM period). Additionally, intervals $T_A$ is the inverse of intervals $T_C$. Each of these intervals $T_A$, $T_B$, and $T_C$ are shown in FIG. 7B, and the corresponding set of PWM signals can be seen in FIG. 7C. Again, the zero vector (interval $T_0$) has been "broken up" so as to form a mathematically equivalent voltage vector.

Additionally, there are some conditions (i.e., when both intervals $T_1$ and $T_2$ are small), when compensation can be alternated. For example, if the voltage vector is located sector I where both intervals $T_1$ and $T_2$ are small, compensation with respect to the location of the voltage vector in proximity to sectors VI and II may be alternated. So, under these conditions, the examples shown with respect to FIGS. 6A to 7B may both be used.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. A method for driving a motor having a plurality of phases, the method comprising:
   generating first, second, and third intervals for a pulse width modulation (PWM) period from first and second voltage commands, wherein the first and second voltage commands correspond to a voltage vector for the motor, and wherein the voltage vector has an associated sector;
   determining a conversion formula for the first, second, third intervals based on the associated sector for the voltage vector;
   generating fourth, fifth, and sixth intervals from the conversion formula and the first, second, and third intervals;
   generating a set of PWM signals for the PWM period from the fourth, fifth, and sixth intervals; and
   driving the motor with the set of PWM signals,
   wherein the associated sector is one of a first, second, third, fourth, fifth, and six sectors, and wherein the motor has three phases,
   wherein the associated sector is the first sector or the fourth sector, and wherein the step of determining the conversion formula further comprises:
   if the voltage vector is in proximity to the sixth sector or third sector, dividing the sum of the PWM period and the second interval by two to generate the fourth interval;
   if the voltage vector is in proximity to the sixth sector or third sector, dividing the sum of the PWM period, the first interval, and the negative of the third interval by two to generate the fifth interval; and
   if the voltage vector is in proximity to the sixth sector or third sector, equating the inverse of the fourth interval to generate the sixth interval.

2. The method of claim 1, wherein the step of determining the conversion formula further comprises:

if the voltage vector is in proximity to the second sector or fifth sector, dividing the sum of the PWM period and the negative of the second interval by two to generate the sixth interval;

if the voltage vector is in proximity to the second sector or fifth sector, dividing the sum of the PWM period, the first interval, and the negative of the third interval by two to generate the fifth interval; and if the voltage vector is in proximity to the second sector or fifth sector, equating the fourth interval to the inverse of the sixth interval.

3. The method of claim 1, wherein the associated sector is the second sector or the fifth sector, and wherein the step of determining the conversion formula further comprises:

if the voltage vector is in proximity to the first sector or fourth sector, dividing the sum of the PWM period, the second interval, and the third interval by two to generate the fourth interval;

if the voltage vector is in proximity to the first sector or fourth sector, dividing the sum of the PWM period and the negative of the first interval by two to generate the sixth interval; and if the voltage vector is in proximity to the first sector or fourth sector, equating the fifth interval to the inverse of the sixth interval.

4. The method of claim 3, wherein the step of determining the conversion formula further comprises:

if the voltage vector is in proximity to the third sector or sixth sector, dividing the sum of the PWM period, the second interval, and the third interval by two to generate the fourth interval;

if the voltage vector is in proximity to the third sector or sixth sector, dividing the sum of the PWM period and the first interval by two to generate the fifth interval; and if the voltage vector is in proximity to the third sector or sixth sector, equating the sixth interval to the inverse of the fifth interval.

5. The method of claim 1, wherein the associated sector is the third sector or the sixth sector, and wherein the step of determining the conversion formula further comprises:

if the voltage vector is in proximity to the second sector or fifth sector, dividing the sum of the PWM period and the negative of the third interval by two to generate the fifth interval;

if the voltage vector is in proximity to the second sector or fifth sector, dividing the sum of the PWM period, the negative of the second interval, and the negative of the first interval by two to generate the sixth interval; and if the voltage vector is in proximity to the second sector or fifth sector, equating the fourth interval to the inverse of the fifth interval.

6. The method of claim 5, wherein the step of determining the conversion formula further comprises:

if the voltage vector is in proximity to the second sector or fifth sector, dividing the sum of the PWM period and the third interval by two to generate the fourth interval;

if the voltage vector is in proximity to the second sector or fifth sector, dividing the sum of the PWM period, the negative of the second interval, and the negative of the first interval by two to generate the sixth interval; and if the voltage vector is in proximity to the second sector or fifth sector, equating the fifth interval to the inverse of the fourth interval.

7. An apparatus comprising:
a motor having a plurality of phases;
an inverter that is coupled to drive the motor;
a sense resistor that is coupled to the inverter, wherein the sense resistor is configured to measure the current for each phase of the motor;
an analog-to-digital converter (ADC) that is coupled to the sense resistor; and
a controller that is coupled ADC; and
a space vector pulse width modulator (SVPWM) that is coupled to the controller and the inverter, wherein the SVPWM includes a processor having a memory with a computer program embodied thereon, and wherein the computer programs includes:
computer code for generating first, second, and third intervals for a PWM period from first and second voltage commands, wherein the first and second voltage commands correspond to a voltage vector for the motor, and wherein the voltage vector has an associated sector;
computer code for determining a conversion formula for the first, second, third intervals based on the associated sector for the voltage vector;
computer code for generating fourth, fifth, and sixth intervals from the conversion formula and the first, second, and third intervals; and
computer code for generating a set of PWM signals for the PWM period from the fourth, fifth, and sixth intervals,
wherein the associated sector is one of a first, second, third, fourth, fifth, and six sectors, and wherein the motor has three phases,
wherein the associated sector is the first sector or the fourth sector, and wherein the computer code for determining the conversion formula further comprises:
computer code for dividing the sum of the PWM period and the second interval by two to generate the fourth interval if the voltage vector is in proximity to the sixth sector or third sector;
computer code for dividing the sum of the PWM period, the first interval, and the negative of the third interval by two to generate the fifth interval if the voltage vector is in proximity to the sixth sector or third sector; and
computer code for equating the inverse of the fourth interval to generate the sixth interval if the voltage vector is in proximity to the sixth sector or third sector.

8. The apparatus of claim 7, wherein the computer code for determining the conversion formula further comprises:
computer code for dividing the sum of the PWM period and the negative of the second interval by two to generate the sixth interval if the voltage vector is in proximity to the second sector or fifth sector;
computer code for dividing the sum of the PWM period, the first interval, and the negative of the third interval by two to generate the fifth interval if the voltage vector is in proximity to the second sector or fifth sector; and
computer code for equating the fourth interval to the inverse of the sixth interval if the voltage vector is in proximity to the second sector or fifth sector.

9. The apparatus of claim 7, wherein the associated sector is the second sector or the fifth sector, and wherein the computer code for determining the conversion formula further comprises:
computer code for dividing the sum of the PWM period, the second interval, and the third interval by two to generate the fourth interval if the voltage vector is in proximity to the first sector or fourth sector;

computer code for dividing the sum of the PWM period and the negative of the first interval by two to generate the sixth interval if the voltage vector is in proximity to the first sector or fourth sector; and computer code for equating the fifth interval to the inverse of the sixth interval if the voltage vector is in proximity to the first sector or fourth sector.

10. The apparatus of claim 9, wherein the computer code for determining the conversion formula further comprises:

computer code for dividing the sum of the PWM period, the second interval, and the third interval by two to generate the fourth interval if the voltage vector is in proximity to the third sector or sixth sector;

computer code for dividing the sum of the PWM period and the first interval by two to generate the fifth interval if the voltage vector is in proximity to the third sector or sixth sector; and computer code for equating the sixth interval to the inverse of the fifth interval if the voltage vector is in proximity to the third sector or sixth sector.

11. The apparatus of claim 7, wherein the associated sector is the third sector or the sixth sector, and wherein the computer code for determining the conversion formula further comprises:

computer code for dividing the sum of the PWM period and the negative of the third interval by two to generate the fifth interval if the voltage vector is in proximity to the second sector or fifth sector;

computer code for dividing the sum of the PWM period, the negative of the second interval, and the negative of the first interval by two to generate the sixth interval if the voltage vector is in proximity to the second sector or fifth sector; and computer code for equating the fourth interval to the inverse of the fifth interval if the voltage vector is in proximity to the second sector or fifth sector.

12. The apparatus of claim 11, wherein the computer code for determining the conversion formula further comprises:

computer code for dividing the sum of the PWM period and the third interval by two to generate the fourth interval if the voltage vector is in proximity to the second sector or fifth sector;

computer code for dividing the sum of the PWM period, the negative of the second interval, and the negative of the first interval by two to generate the sixth interval if the voltage vector is in proximity to the second sector or fifth sector; and computer code for equating the fifth interval to the inverse of the fourth interval if the voltage vector is in proximity to the second sector or fifth sector.

13. An apparatus comprising:

a motor having a three phases;

an inverter that is coupled to drive the motor;

a sense resistor that is coupled to the inverter, wherein the sense resistor is configured to measure the current for each phase of the motor;

an ADC that is coupled to the sense resistor; and a controller that is coupled ADC; and a SVPWM that is coupled to the controller and the inverter, wherein the SVPWM includes a processor having a memory with a computer program embodied thereon, and wherein the computer programs includes:

computer code for generating first, second, and third intervals for a PWM period from first and second voltage commands, wherein the first and second voltage commands correspond to a voltage vector for the motor, and wherein the voltage vector has an associated sector, and wherein the associated sector is one of a first, second, third, fourth, fifth, and six sectors;

computer code for determining a conversion formula for the first, second, third intervals based on the associated sector for the voltage vector that includes:

computer code for dividing the sum of the PWM period and the second interval by two to generate the fourth interval if the voltage vector is in proximity to the sixth sector or third sector when the associated sector is the first sector or the fourth sector;

computer code for dividing the sum of the PWM period, the first interval, and the negative of the third interval by two to generate the fifth interval if the voltage vector is in proximity to the sixth sector or third sector when the associated sector is the first sector or the fourth sector;

computer code for dividing the sum of the PWM period and the negative of the second interval by two to generate the sixth interval if the voltage vector is in proximity to the second sector or fifth sector when the associated sector is the first sector or the fourth sector;

computer code for dividing the sum of the PWM period, the first interval, and the negative of the third interval by two to generate the fifth interval if the voltage vector is in proximity to the second sector or fifth sector when the associated sector is the first sector or the fourth sector;

computer code for equating the fourth interval to the inverse of the sixth interval if the voltage vector is in proximity to the second sector or fifth sector when the associated sector is the first sector or the fourth sector;

computer code for dividing the sum of the PWM period, the second interval, and the third interval by two to generate the fourth interval if the voltage vector is in proximity to the first sector or fourth sector when the associated sector is the second sector or the fifth sector;

computer code for dividing the sum of the PWM period and the negative of the first interval by two to generate the sixth interval if the voltage vector is in proximity to the first sector or fourth sector when the associated sector is the second sector or the fifth sector;

computer code for equating the fifth interval to the inverse of the sixth interval if the voltage vector is in proximity to the first sector or fourth sector when the associated sector is the second sector or the fifth sector;

computer code for dividing the sum of the PWM period, the second interval, and the third interval by two to generate the fourth interval if the voltage vector is in proximity to the third sector or sixth sector when the associated sector is the second sector or the fifth sector;

computer code for dividing the sum of the PWM period and the first interval by two to generate the fifth interval if the voltage vector is in proximity to the third sector or sixth sector when the associated sector is the second sector or the fifth sector;

computer code for equating the sixth interval to the inverse of the fifth interval if the voltage vector is in proximity to the third sector or sixth sector when the associated sector is the second sector or the fifth sector;

computer code for dividing the sum of the PWM period and the negative of the third interval by two to generate the fifth interval if the voltage vector is in proximity to the second sector or fifth sector when the associated sector is the third sector or the sixth sector;

computer code for dividing the sum of the PWM period, the negative of the second interval, and the negative of the first interval by two to generate the sixth interval if the voltage vector is in proximity to the second sector or fifth sector the associated sector is the third sector or the sixth sector;

computer code for equating the fourth interval to the inverse of the fifth interval if the voltage vector is in proximity to the second sector or fifth sector the associated sector is the third sector or the sixth sector;

computer code for dividing the sum of the PWM period and the third interval by two to generate the fourth interval if the voltage vector is in proximity to the second sector or fifth sector the associated sector is the third sector or the sixth sector;

computer code for dividing the sum of the PWM period, the negative of the second interval, and the negative of the first interval by two to generate the sixth interval if the voltage vector is in proximity to the second sector or fifth sector the associated sector is the third sector or the sixth sector; and computer code for equating the fifth interval to the inverse of the fourth interval if the voltage vector is in proximity to the second sector or fifth sector the associated sector is the third sector or the sixth sector;

computer code for equating the inverse of the fourth interval to generate the sixth interval if the voltage vector is in proximity to the sixth sector or third sector;

computer code for generating fourth, fifth, and sixth intervals from the conversion formula and the first, second, and third intervals; and computer code for generating a set of PWM signals for the PWM period from the fourth, fifth, and sixth intervals.

* * * * *